US012707245B2

(12) United States Patent
Baladhandapani et al.

(10) Patent No.: US 12,707,245 B2
(45) Date of Patent: Aug. 11, 2026

(54) SYSTEMS AND METHODS FOR PROMOTING COMMUNICATION BETWEEN MOBILE PLATFORMS

(71) Applicant: HONEYWELL INTERNATIONAL INC., Charlotte, NC (US)

(72) Inventors: Gobinathan Baladhandapani, Madurai (IN); Sivakumar Kanagarajan, Bangalore (IN); Sunit Kumar Saxena, Urbana, OH (US); Karthikeyan Mariappan, Madurai (IN)

(73) Assignee: Honeywell Aerospace US LLC, Phoenix, AZ (US)

(*) Notice: Subject to any disclaimer, the term of this patent is extended or adjusted under 35 U.S.C. 154(b) by 579 days.

(21) Appl. No.: 18/333,915

(22) Filed: Jun. 13, 2023

(65) Prior Publication Data

US 2024/0365099 A1 Oct. 31, 2024

(30) Foreign Application Priority Data

Apr. 28, 2023 (IN) ............................ 202311030623

(51) Int. Cl.

| | |
|---|---|
| ***H04W 4/90*** | (2018.01) |
| ***G10L 17/04*** | (2013.01) |
| ***H04W 4/021*** | (2018.01) |

(52) U.S. Cl.

CPC ............... *H04W 4/90* (2018.02); *G10L 17/04* (2013.01); *H04W 4/021* (2013.01)

(58) Field of Classification Search

CPC ......... G10L 17/00; G10L 15/16; G01C 21/20; G01C 21/3415; G01C 21/3461; G01C 21/362; G01C 21/3623; G01C 21/3647; G01C 21/365; G01C 21/3676; G01C 21/3697; G01S 5/18; G06Q 10/047;

(Continued)

(56) References Cited

U.S. PATENT DOCUMENTS

| | | | |
|---|---|---|---|
| 7,127,683 | B2 | 10/2006 | Royalty |
| 8,243,902 | B2 | 8/2012 | Caspi et al. |

(Continued)

FOREIGN PATENT DOCUMENTS

| | | | |
|---|---|---|---|
| CA | 2691640 | C | 11/2015 |
| CN | 102270451 | B | 12/2011 |

(Continued)

*Primary Examiner* — Matthew C Sams

(74) *Attorney, Agent, or Firm* — Ingrassia Fisher & Lorenz

(57) ABSTRACT

Systems and methods are provided for promoting communication between mobile platforms. The systems include a database storing voice profiles, a communication system configured to receive audio data from each of the mobile platforms that include speech from operators of the mobile platforms, a display system configured to provide a common display in each of the mobile platforms that includes a terrain environment and mobile platform icons for each of the mobile platforms on the terrain environment indicating the locations thereof, a controller configured to, by a processor: analyze the speech of the audio data to identify in real-time a first of the operators that is currently speaking by correlating the speech with one of the voice profiles, identify a first of the mobile platforms associated with the first operator, and indicate, on the common display, in real-time that the audio data is associated with the first mobile platform.

20 Claims, 6 Drawing Sheets

(58) Field of Classification Search
CPC ........ G06Q 10/06; G06T 17/05; G08G 1/161; G06V 20/56; H04N 7/15; H04W 4/90; H04W 4/021
See application file for complete search history.

(56) References Cited

U.S. PATENT DOCUMENTS

| | | | | |
|---|---|---|---|---|
| 8,345,098 | B2 * | 1/2013 | Grigsby | G06V 20/56 348/148 |
| 8,631,336 | B2 | 1/2014 | Cabaret et al. | |
| 8,723,670 | B2 | 5/2014 | Rabey | |
| 9,704,405 | B2 | 7/2017 | Kashi et al. | |
| 9,812,131 | B2 | 11/2017 | Parker et al. | |
| 10,536,288 | B1 | 1/2020 | Leblang et al. | |
| 10,955,253 | B2 * | 3/2021 | Mathew | G01C 21/3676 |
| 11,023,547 | B2 | 6/2021 | Chalouhi et al. | |
| 2009/0138521 | A1 | 5/2009 | Buster | |
| 2012/0022774 | A1 | 1/2012 | Pinheiro et al. | |
| 2017/0059343 | A1 * | 3/2017 | Spinelli | G01C 21/20 |
| 2017/0206790 | A1 | 7/2017 | Reddy et al. | |
| 2019/0279614 | A1 * | 9/2019 | Ye | G10L 15/187 |
| 2020/0086881 | A1 | 3/2020 | Abendroth et al. | |
| 2021/0019545 | A1 | 1/2021 | Constantino et al. | |

FOREIGN PATENT DOCUMENTS

| | | | | | |
|---|---|---|---|---|---|
| CN | 114513622 | A | * | 5/2022 | H04N 7/15 |
| EP | 2290924 | A1 | | 8/2010 | |
| JP | 2021033944 | A | * | 3/2021 | |
| JP | 7451901 | B2 | * | 3/2024 | |
| KR | 101595831 | B1 | | 2/2016 | |
| KR | 20170136716 | A | | 12/2017 | |
| KR | 102457811 | B1 | | 10/2022 | |

* cited by examiner

500
Display View of VT-SRS
ADS-B OUT-FAILED
XPDR Code-2234
TAS-320
No Pilot Input for 15 seconds
512
510
520

600
612A
612D
610
614
620
612C
612B 700
718
716
712D
718
718
718
714
710
720
712C

SYSTEMS AND METHODS FOR PROMOTING COMMUNICATION BETWEEN MOBILE PLATFORMS

CROSS REFERENCE TO RELATED APPLICATION

The present application claims benefit of prior filed India Provisional Patent Application No. 202311030623, filed Apr. 28, 2023, which is hereby incorporated by reference herein in its entirety.

TECHNICAL FIELD

The present invention generally relates to aircraft systems, and more particularly relates to systems and methods for promoting efficient, real-time communication and coordination between mobile platforms.

BACKGROUND

Search and Rescue (SAR) operations play a vital role in reducing devastating impacts caused by disasters and the degree by which the impacts are mitigated may be directly related to the overall efficiency of the SAR operation. Various aircraft are often deployed during SAR operations to perform functions such as analyzing the region and obtaining necessary information quickly before proceeding by ground. The efficiency of this phase of SAR operations may depend on the quality of coordination and communication of these aircraft.

In coordinated aerial systems such as SAR operations, formation flying, and landing coordination in uncontrolled ports (e.g., certain Urban Air Mobility (UAM) operations), information sharing between aircraft may present a significant challenge. For example, communication is typically provided through radio telephony, which is a broadcast type of communication where only one operator may speak while others listen. As the number of aircraft increase within the coordinated aerial system, the difficulty for each operators to communicate increases. Further, providing detailed information can cause additional communication congestion.

Hence, there is a need for systems and methods for promoting efficient communication and/or coordination between aircraft within a coordinated aerial system. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for promoting communication between mobile platforms. The method comprises storing, in one or more databases, voice profile data including voice profiles associated with operators of each of the mobile platforms, receiving audio data that include speech from the operators of the mobile platforms, optionally, receiving transponder data indicating locations of each of the mobile platforms, providing, by a processor, a common display on display devices in each of the mobile platforms, the common display including a terrain environment and mobile platform icons for each of the mobile platforms on the terrain environment indicating the locations of each of the mobile platforms, analyzing, by the processor, the speech of the audio data to identify in real-time a first of the operators of the mobile platforms that is currently speaking by correlating the speech with one of the voice profiles of the voice profile data, identifying, by the processor, a first of the mobile platforms associated with the first operator, and indicating, on the common display by the processor, in real-time that the audio data is associated with the first mobile platform.

A system is provided for promoting communication between mobile platforms. The system comprises one or more databases storing voice profile data including voice profiles associated with operators of each of the mobile platforms, a communication system configured to receive audio data from each of the mobile platforms that include speech from the operators of the mobile platforms, wherein the communication system is optionally configured to receive transponder data from each of the mobile platforms indicating locations of each of the mobile platforms, a display system configured to provide a common display on display devices in each of the mobile platforms, the common display including a terrain environment and mobile platform icons for each of the mobile platforms on the terrain environment indicating the locations of each of the mobile platforms, a controller in operable communication with the one or more databases, the communication system, and the display system, the controller configured to, by a processor: analyze the speech of the audio data to identify in real-time a first of the operators of the mobile platforms that is currently speaking by correlating the speech with one of the voice profiles of the voice profile data, identify a first of the mobile platforms associated with the first operator, and indicate, on the common display, in real-time that the audio data is associated with the first mobile platform.

Furthermore, other desirable features and characteristics of the system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
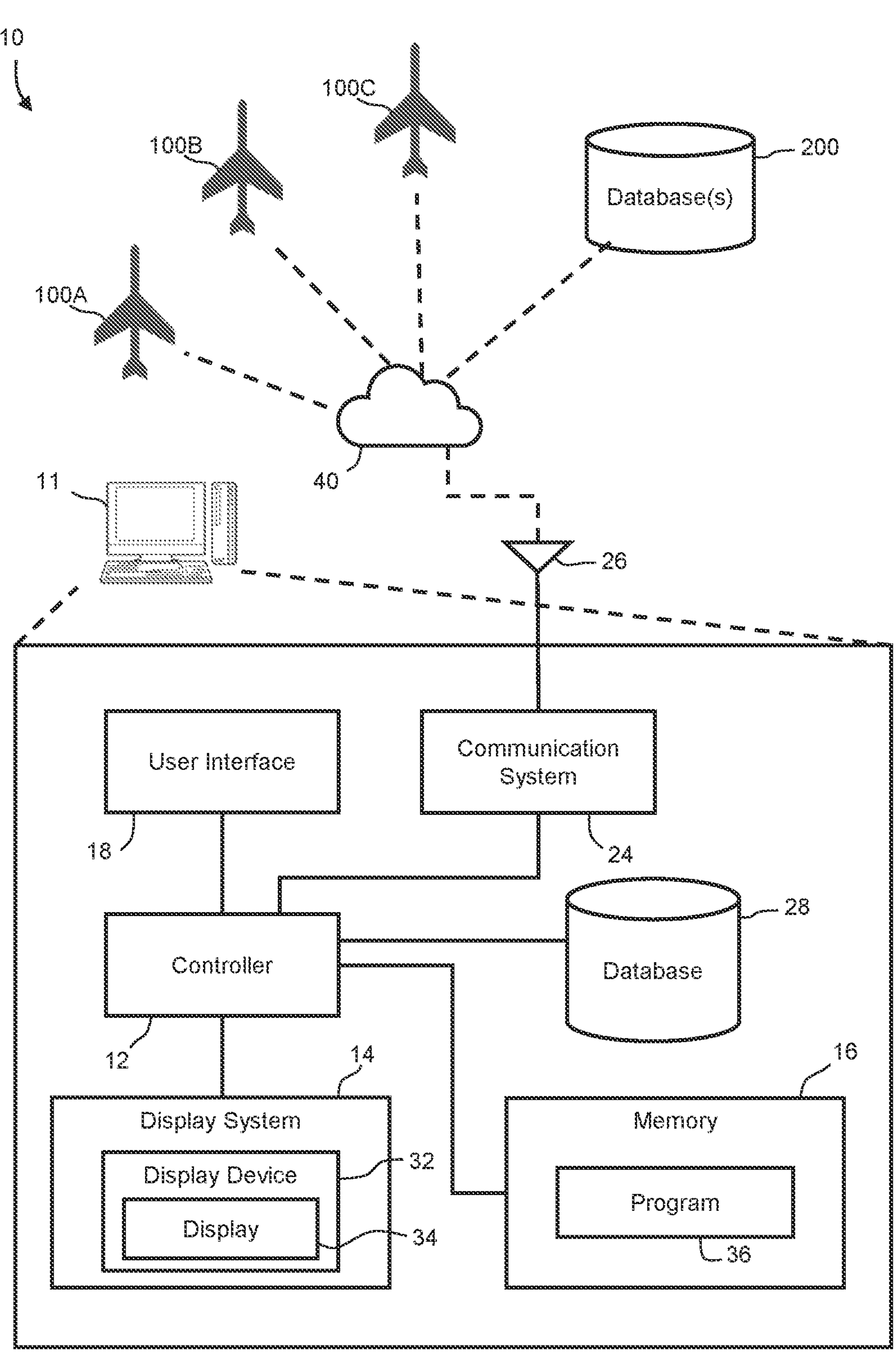
FIGS. 1 and 2 schematically represent a shared communication system that includes multiple mobile platforms and a mission controller in accordance with an embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein provide for promoting efficient, real-time communication and coordination between mobile platforms, and are especially applicable to groups of mobile platforms operating in a coordinated effort, maneuver, or mission. Broadly, the systems and methods provide a common display that may be rendered on display devices in each of the mobile platforms that provides shared community information in real-time to promote situational awareness for the crew of each of the mobile platforms. In various embodiments, the common display may also be provided to a mission controller for remote coordination of the mobile platforms during the coordinated effort.

In various embodiments, the systems and methods include providing, on the common display, a terrain environment and mobile platform icons representing each of the mobile platforms on the terrain environment indicating the locations of each of the mobile platforms based on transponder data received therefrom.

In various embodiments, the systems and methods include providing access to voice profile data that includes voice profiles associated with operators of each of the mobile platforms. Using the voice profile data, audio data that include speech from the operators of the mobile platforms may be received and analyzed to determine which of the mobile platforms is generating the audio data, that is, which crew is currently communicating with the other mobile platforms. The identified mobile platform may then be indicated on the common display such that the other operators are aware of who is speaking and a location of the speaker.

The mobile platforms may be any type of vehicle, such as but not limited to various types of aircraft. It should be noted that the term aircraft, as utilized herein, may include any manned or unmanned object capable of flight. Examples of aircraft may include, but are not limited to, fixed-wing aerial vehicles (e.g., propeller-powered or jet powered), rotary-wing aerial vehicles (e.g., helicopters), manned aircraft, unmanned aircraft (e.g., unmanned aerial vehicles, or UAVs), delivery drones, etc. For convenience, the systems and methods will be described in reference to multiple manned aircraft; however, as noted the systems and methods are not limited to such application.

In various embodiments, the systems and methods may be associated with one or more of the mobile platforms and/or with a mission controller remote from the mobile platforms. For convenience, the systems and methods are described in reference to performance of a SAR operation that includes multiple aircraft with coordination and communication promoted via a mission controller remote from the aircraft. However, the systems and methods are not limited to such applications, and may be applicable to other operations, other number and types of mobile platforms, and may or may not include a separate mission controller.

Figure 2:
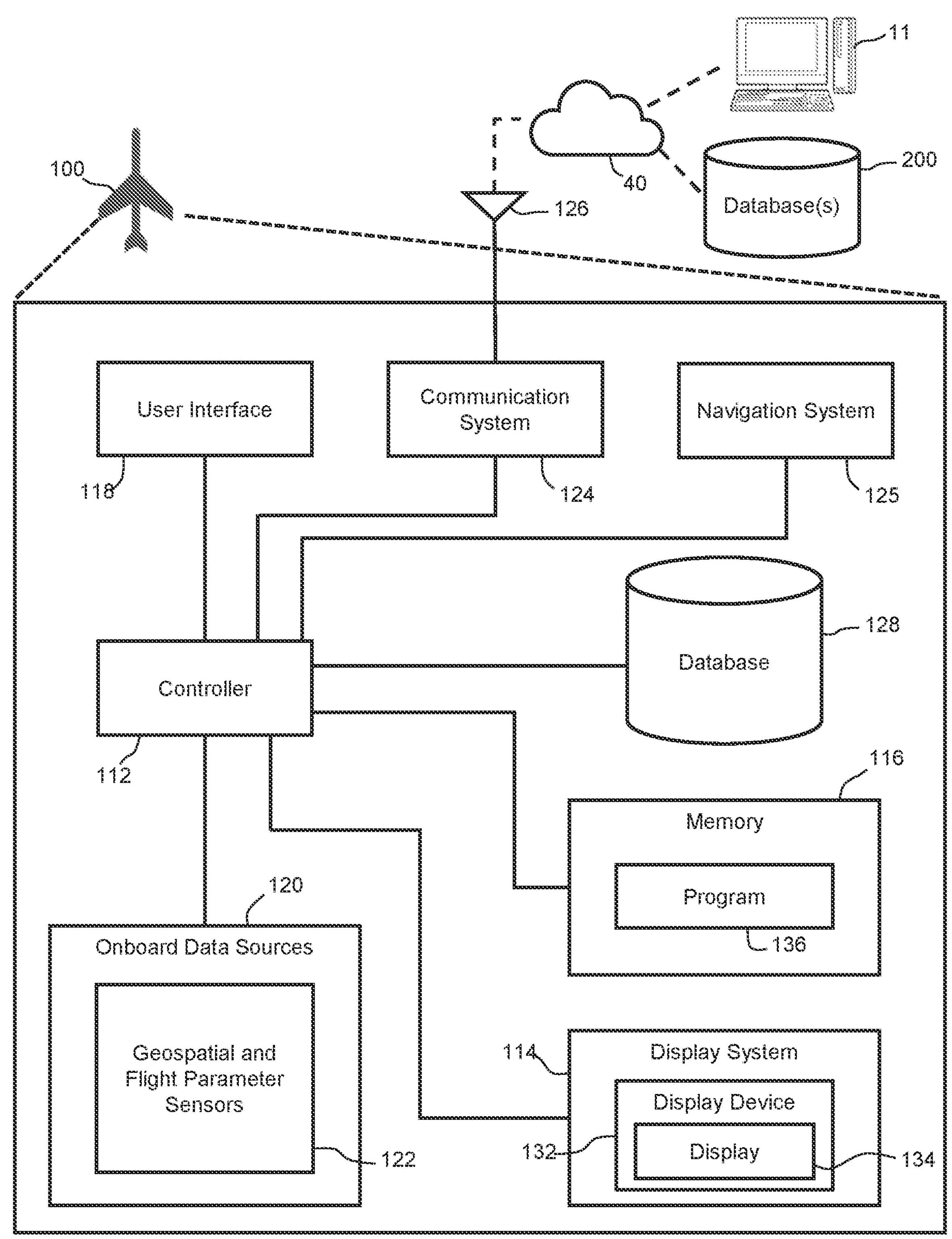

Referring now to FIGS. 1 and 2, a system 10 and certain systems thereof are illustrated in accordance with an exemplary and nonlimiting embodiment of the present disclosure. The system 10 includes a mission controller 11, multiple aircraft 100 (in this example, three aircraft 100A, 100B, and 100C), and one or more databases 200 in communication via a network 40. FIG. 1 presents certain systems of the mission controller 11 and FIG. 2 presents certain systems of the aircraft 100.

As schematically depicted in FIG. 1, the mission controller 11 includes and/or is functionally coupled to the following components or subsystems, each of which may assume the form of a single device or multiple interconnected devices, including, but not limited to, a controller 12 operationally coupled to: at least one display device 32, which may optionally be part of a larger on-board display system 14; computer-readable storage media or memory 16; a user interface 18, a communication system 24, and, optionally, one or more databases 28. The communication system 24 includes an antenna 26, which may wirelessly transmit data to and receive data from various external sources physically and/or geographically remote to the mission controller 11.

As schematically depicted in FIG. 2, each aircraft 100 includes and/or is functionally coupled to the following components or subsystems, each of which may assume the form of a single device or multiple interconnected devices, including, but not limited to, a controller 112 operationally coupled to: at least one display device 132, which may optionally be part of a larger on-board display system 114; computer-readable storage media or memory 116; a user interface 118, onboard data sources 120 including, for example, an array of geospatial and flight parameter sensors 122, a communication system 124, a navigation system 125, and, optionally, one or more databases 128. The communication system 124 includes an antenna 126, which may wirelessly transmit data to and receive data from various external sources physically and/or geographically remote to the aircraft 100.

Although schematically illustrated in FIGS. 1 and 2 as single units, the individual elements and components of mission controller 11 and the aircraft 100 can be implemented in a distributed manner utilizing any practical number of physically distinct and operatively interconnected pieces of hardware or equipment.

The term "controller," as appearing herein, broadly encompasses those components utilized to carry-out or otherwise support the processing functionalities of the system 10. Accordingly, the controllers 12 and 112 can each encompass or may be associated with any number of individual processors, flight control computers, navigational equipment pieces, computer-readable memories (including or in addition to the memory 16 and 116), power supplies, storage devices, interface cards, and other standardized components.

In various embodiments, the controllers 12 and 112 each include at least one processor, a communication bus, and a computer readable storage device or media. The processor performs the computation and control functions of the respective controller 12/112. The processor can be any custom made or commercially available processor, a central processing unit (CPU), a graphics processing unit (GPU), an auxiliary processor among several processors associated with the controller 12/112, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 12/112. The bus serves to transmit programs, data, status and other information or signals between the various components of the mission controller 11 or the aircraft 100. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, receive and process signals, perform logic, calculations, methods and/or algorithms, and generate data based on the logic, calculations, methods, and/or algorithms. Although only one controller 12 is shown in FIG. 1 and one controller 112 in FIG. 2, embodiments of the mission controller 11 and the aircraft 100 can include any number of controllers 12/112 that communicate over any suitable communication medium or a combination of communication mediums and that cooperate to process the sensor signals, perform logic, calculations, methods, and/or algorithms, and generate data. In various embodiments, the controllers 12 and/or 112 includes or cooperates with at least one firmware and software program (generally, computer-readable instructions that embody an algorithm) for carrying-out the various process tasks, calculations, and control/display functions described herein. During operation, the controller 12/112 may be programmed with and execute at least one firmware or software program, for example, a program 36/136, that embodies one or more algorithms, to thereby perform the various process steps, tasks, calculations, and control/display functions described herein.

The controllers 12 and 112 may exchange data with one or more external sources to support operation of the system 10 in various embodiments. In this case, bidirectional wireless data exchange may occur via the communication systems 24 and 124 over the communications network 40, such as a radio communications network capable of half-duplex operation. In various embodiments, the communication systems 24 and 124 may incorporate other types of systems such as a public or private network implemented in accordance with Transmission Control Protocol/Internet Protocol architectures or other conventional protocol standards. Encryption and mutual authentication techniques may be applied, as appropriate, to ensure data security.

In various embodiments, the communication systems 24 and 124 are each configured to support instantaneous (i.e., real time or current) communications between on-board systems, the controller 12/112, and the one or more external sources. The communication systems 24 and 124 may each incorporate one or more transmitters, receivers, and the supporting communications hardware and software required for components of the system 10 to communicate as described herein. In various embodiments, the communication systems 24 and/or 124 may have additional communications not directly relied upon herein, such as bidirectional pilot-to-ATC (air traffic control) communications via a datalink, and any other suitable radio communication system that supports communications between the mission controller 11, the aircraft 100, and various external source(s).

The memories 16 and 116 can each encompass any number and type of storage media suitable for storing computer-readable code or instructions, such as the program 36/136, as well as other data generally supporting the operation of the system 10. As can be appreciated, the memories 16 and 116 may be part of the respective controller 12 or 112, separate from the respective controller 12 or 112, or part of the respective controller 12 or 112 and part of a separate system. The memories 16 and 116 can each be any suitable type of storage apparatus, including various different types of direct access storage and/or other memory devices.

A source of information suitable for operating one or more systems of the mission controller 11 and the aircraft 100 may be part of the system 10. In certain embodiments, the source is one or more local databases 28/128 and/or one or more remote databases 200 employed to receive and store data, which may be updated on a periodic or iterative basis to ensure data timeliness. In various embodiments, the data may include various terrain locations and elevations and may be stored in the memory 16/116 or in the one or more databases 28/128/200, and referenced by the program 36/136. In various embodiments, these databases 28/128/200 may be available online and accessible remotely by a suitable wireless communication system, such as the communication system 24/124.

With continued reference to FIGS. 1 and 2, the display devices 32 and 132 can each include any number and type of image generating devices on which one or more displays 34 and 134, respectively, may be produced. At least one display 34 and 134 is generated on each of the display devices 32 and 132, respectively, during operation of the system 10. The system 10 can generate various types of lateral and vertical avionic displays 34/134 on which symbology, text annunciations, and other graphics pertaining to flight planning are presented for an operator and/or a pilot to view. The display devices 32 and 132 are configured to continuously render at least one display 34 or 134 showing a common graphical display.

In various embodiments, the display device 132 may be affixed to the static structure of the aircraft 100 cockpit as, for example, a Head Down Display (HDD) or Head Up Display (HUD) unit. Alternatively, the display device 32 may assume the form of a movable display device (e.g., a pilot-worn display device) or a portable display device, such as an Electronic Flight Bag (EFB), a laptop, or a tablet computer carried into the aircraft 100 cockpit by a pilot. The display 134 generated and controlled by the system 10 can include alphanumerical input displays of the type commonly presented on the screens of multi-function control and display units (MCDUs), as well as Control Display Units (CDUs) generally. Specifically, certain embodiments of the display 134 include one or more two-dimensional (2D) avionic displays, such as a horizontal (i.e., lateral) navigation display or vertical navigation display; and/or on one or more three-dimensional (3D) avionic displays, such as a Primary Flight Display (PFD) or an exocentric 3D avionic display.

In various embodiments, a human-machine interface, such as a touch screen display, is implemented as an integration of each of the user interfaces 18 and 118 and the display devices 32 and 132. Via various display and graphics systems processes, the controllers 12 and 112 may command and control the touch screen display generating a variety of graphical user interface (GUI) objects or elements, for example, buttons, sliders, and the like, which are used to prompt a user to interact with the human-machine interface to provide user input, and to activate respective functions and provide user feedback, responsive to received user input at the GUI element.

Referring to FIG. 2, the sensors 122 supply various types of data and/or measurements to the controller 112. In various embodiments, the sensors 122 supply, without limitation, one or more of: inertial reference system measurements providing a location, Flight Path Angle (FPA) measurements, airspeed data, groundspeed data, vertical speed data, vertical acceleration data, altitude data, attitude data including pitch and roll measurements, yaw data, data related to ownship weight, time/date information, heading information, data related to atmospheric conditions, flight path data, flight track data, radar altitude data, geometric altitude data, wind speed and direction data. Further, in certain embodiments of the system 10, the controller 112, and the other components of the system 10 may be included within or cooperate with any number and type of systems commonly deployed onboard aircraft including, for example, an FMS, an Attitude Heading Reference System (AHRS), an Instrument Landing System (ILS), and/or an Inertial Reference System (IRS).

Other systems onboard the aircraft 100 that are in communication with the controller 112 may include but are not limited to a flight control system, a traffic awareness and collision avoidance system, a fuel system, an electric system, an engine system, a transponder system, and a searchlight system.

Figure 3:
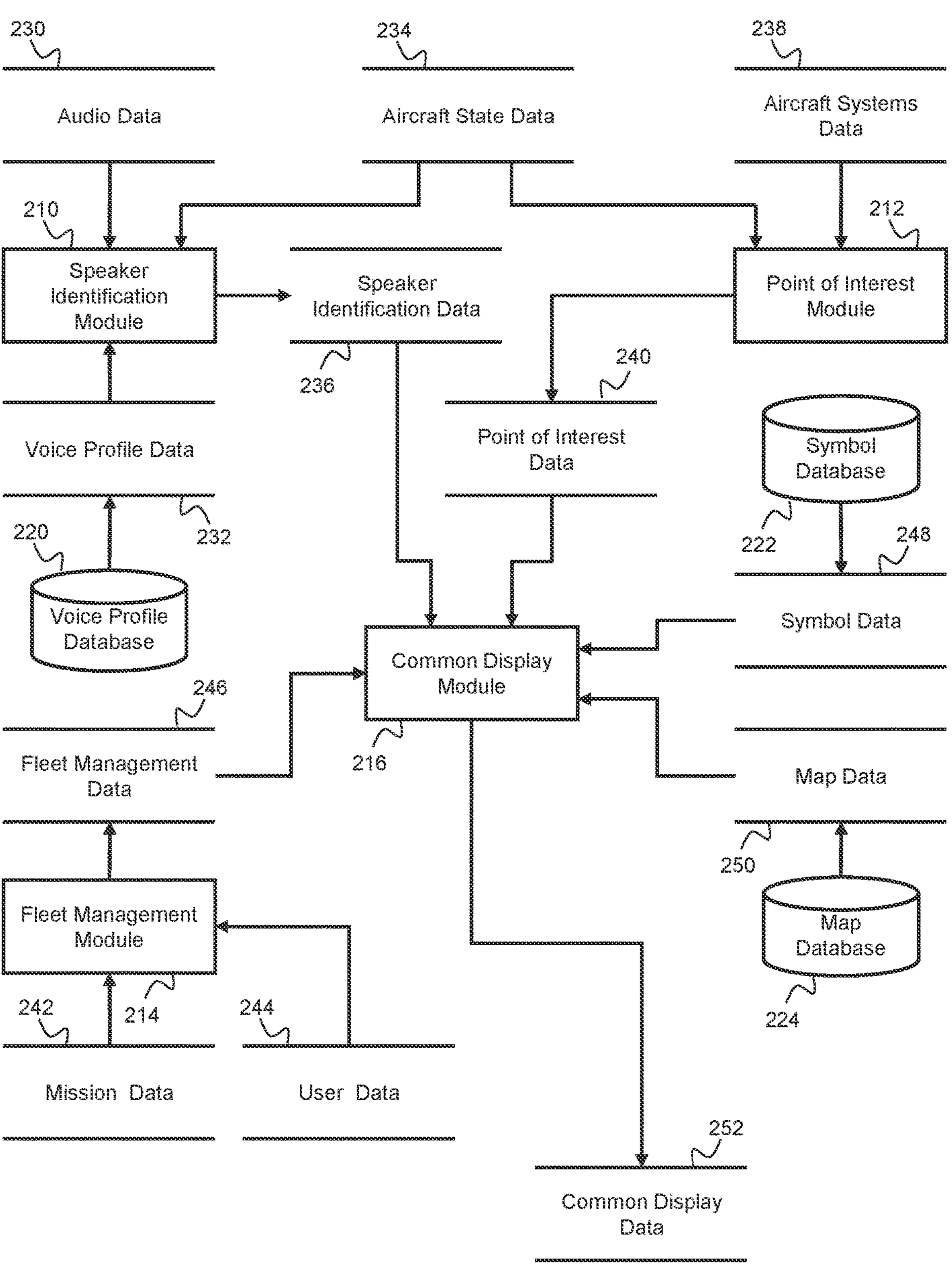
FIG. 3 is a dataflow diagram illustrating an exemplary operation of the shared communication system of FIGS. 1 and 2 in accordance with an embodiment.

With reference to FIG. 3 and with continued reference to FIGS. 1-2, a dataflow diagram illustrates elements of the system 10 of FIGS. 1 and 2 in accordance with various embodiments. As can be appreciated, various embodiments of the system 10 according to the present disclosure may include any number of modules embedded within the controllers 12 and/or 112 which may be combined and/or further partitioned to similarly implement systems and methods described herein. Furthermore, inputs to the system 10 may be received from other control modules (not shown) associated with the mission controller 11 and/or the aircraft 100, and/or determined/modeled by other sub-modules (not shown) within the controllers 12 and/or 112. Furthermore, the inputs might also be subjected to preprocessing, such as sub-sampling, noise-reduction, normalization, feature-extraction, missing data reduction, and the like. In various embodiments, the system 10 includes a speaker identification module 210, a point of interest module 212, a fleet management module 214, and a common display module 216.

In various embodiments, the speaker identification module 210 receives as input audio data 230 generated by the aircraft 100 (e.g., the communication system 124), aircraft state data 234 generated by the aircraft 100 (e.g., the sensors 122 and/or the navigation system 125), and voice profile data 232 retrieved from a voice profile database 220. The audio data 230 includes various data including recordings of speech transmitted by the crew of the aircraft 100. The aircraft state data 234 includes various data indicating various state-related information such as the location of the aircraft 100. The voice profile data 232 includes various data including preprogrammed voice profiles associated with the crew members of the aircraft 100. The speaker identification module 210 performs an analysis of the audio data 230 to identify a speaker based on the voice profile data 232, correlates the speaker to the specific aircraft 100 (also referred to herein as the speaking aircraft 100) on which the speaker is located, and determines the location of the speaking aircraft 100 based on the aircraft state data 234. The speaker identification module 210 generates speaker identification data 236, which includes various data indicating the speaking aircraft 100 and the location of the speaking aircraft 100.

In various embodiments, the point of interest module 212 receives as input the aircraft state data 234 generated by the aircraft 100. In addition, the point of interest module 212 receives as input aircraft systems data 238 generated by the aircraft 100 (e.g., a searchlight system). The aircraft systems data 238 includes various data indicating operational parameters of one or more relevant systems onboard the aircraft 100. For example, the aircraft systems data 238 may include a line-of-sight vector associated with a searchlight, a camera, or another system or device. The point of interest module 212 performs an analysis of the aircraft state data 234 and the aircraft systems data 238 to identify points-of-interest within the area of the mission and locations of such points-of-interest. Nonlimiting examples of points-of-interest may include located targets of the mission (e.g., a missing person, a group of individuals, an encampment, a building, etc.), deployed personnel and/or objects (e.g., via parachute), landmarks, etc. The point of interest module 212 generates point of interest data 240, which includes various data indicating the identified points-of-interest and locations thereof.

In various embodiments, the fleet management module 214 receives as input mission data 242 generated by a user (e.g., via the user interface 18), the aircraft 100, and/or other remote sources. The mission data 242 includes various data indicating mission input parameters of a specific mission. As an example, a SAR operation may include mission input parameters such as a designated search area (e.g., latitude and longitude boundaries, desired search patterns, a number of aircraft available, types of aircrafts available, origins of the aircraft, estimated mission time on station, desired entry course of the aircraft, desired path separate of the aircraft, desired altitude of the aircraft, etc.). The fleet management module 214 performs an analysis of the mission input parameters and determines mission output parameters. For example, in the above-noted SAR operation, the mission output parameters may include, for each of the aircraft 100, a SAR pattern, pattern entry points and an associated estimated time of arrival, pattern exit points and an associated estimated time of arrival, a require time of departure, whether the search area requires multiple flights, the number of flight required, etc. The fleet management module 214 generates fleet management data 246, which includes various data indicating the determined mission output parameters.

In various embodiments, the common display module 216 receives as input the speaker identification data 236 generated by the speaker identification module 210, the point of interest data 240 generated by the point of interest module 212, the fleet management data 246 generated by the fleet management module 214, symbol data 248 retrieved from a symbol database 222, and map data 250 retrieved from a map database 224. The symbol data 248 includes various data indicating various symbols representative of the aircraft 100 and other relevant information. The map data 250 includes various data indicating a terrain of the area covered by the mission (e.g., a search area of a SAR operation). The terrain may include locations, heights, and the like for both natural and man-made objects. The common display module 216 generates common display data 252 that includes various data configured to render each of a common display that includes information relevant to the viewers, such as terrain, flight paths, locations of each of the aircraft 100, types of each of the aircraft 100, headings of each of the aircraft 100, which of the aircraft 100 are currently transmitting audio signals, etc. The common display module 216 may transmit the common display data 252 to the display systems 14 and 114 for display on the common displays of the mission controller 11 and the aircraft 100 (e.g., the displays 34 and 134).

Figure 4:
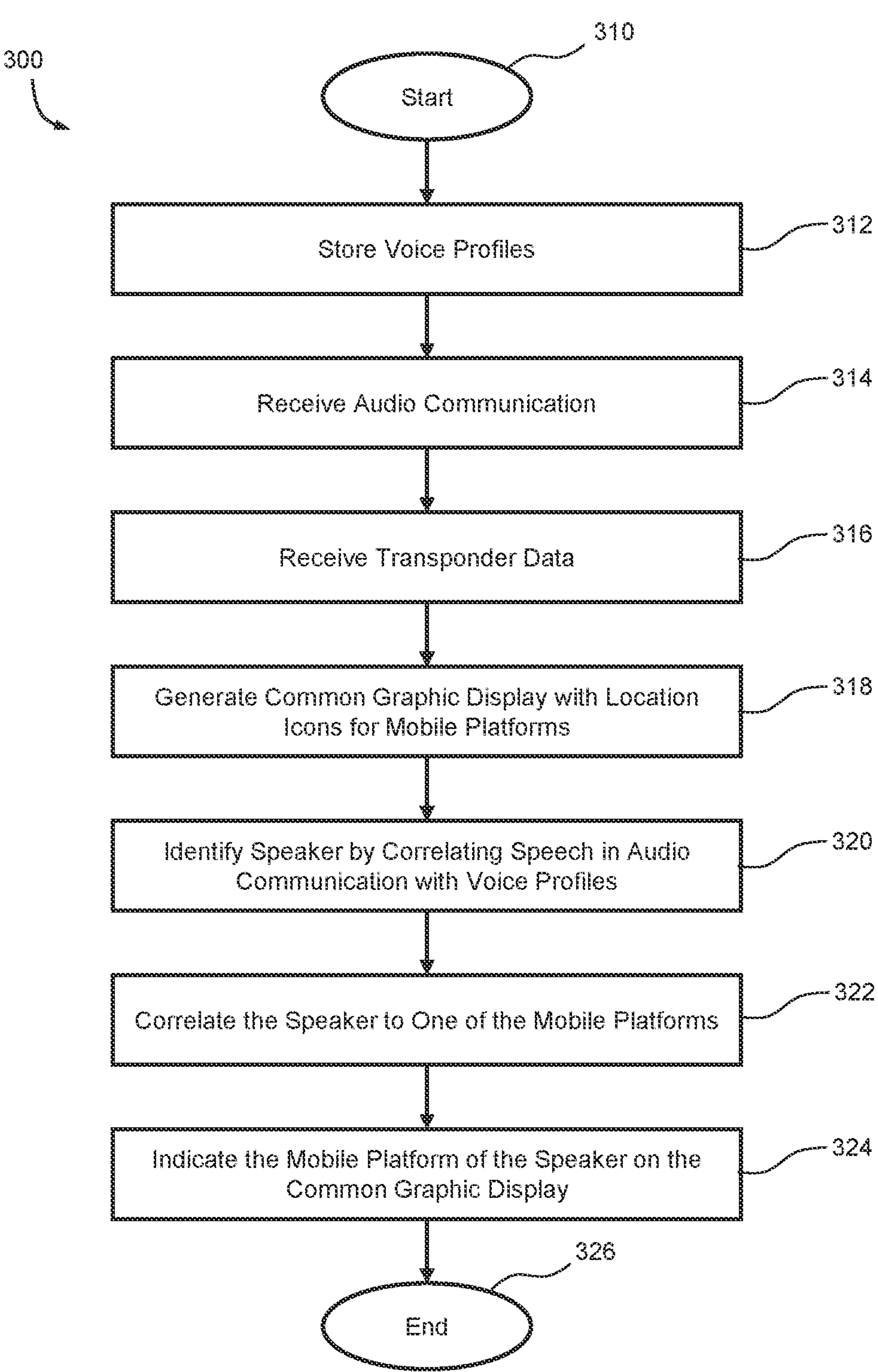
FIG. 4 is a flowchart illustrating an exemplary method for promoting communication between mobile platforms in accordance with an embodiment.

The systems disclosed herein, including the system 10, provide for methods of promoting communication between mobile platforms. For example, FIG. 4 is a flow chart illustrating an exemplary method 300 that may start at 310. At 312, the method 300 may include storing, in one or more, voice profile data including voice profiles associated with operators of each of the mobile platforms. In various embodiments, the one or more databases may be accessible by each of the mobile platforms. At 314, the method 300 may include receiving audio signals, that is, audio communications, that include speech from the operators of the mobile platforms. At 316, the method 300 may include receiving transponder data indicating locations of each of the mobile platforms. At 318, the method 300 may include generating or providing a common display on display devices in each of the mobile platforms. The common display may include a terrain environment and mobile platform icons for each of the mobile platforms on the terrain environment indicating the locations of each of the mobile platforms based on the transponder data. At 320, the method 300 may include processing, by a processor, the speech of the audio signals to identify in real-time which of the operators of the mobile platforms are currently speaking by correlating the speech with one of the voice profiles of the voice profile data. At 322, the method 300 may include identifying the specific mobile platform associated with the operator currently speaking, that is, the mobile platform carrying the speaker. At 324, the method 300 may include indicating, on the common displays, in real-time the specific mobile platform associated with the operator currently speaking. The method 300 may end at 326.

In various embodiments, the method 300 may include producing the voice profiles for the operators of each of the mobile platforms, training a speaker identification module to identify each of the operators using the voice profiles, and testing the speaker identification module to ensure that the speaker identification module is capable of identifying each of the operators in real-time by correlating speech of the operators with the voice profiles.

Figure 5:
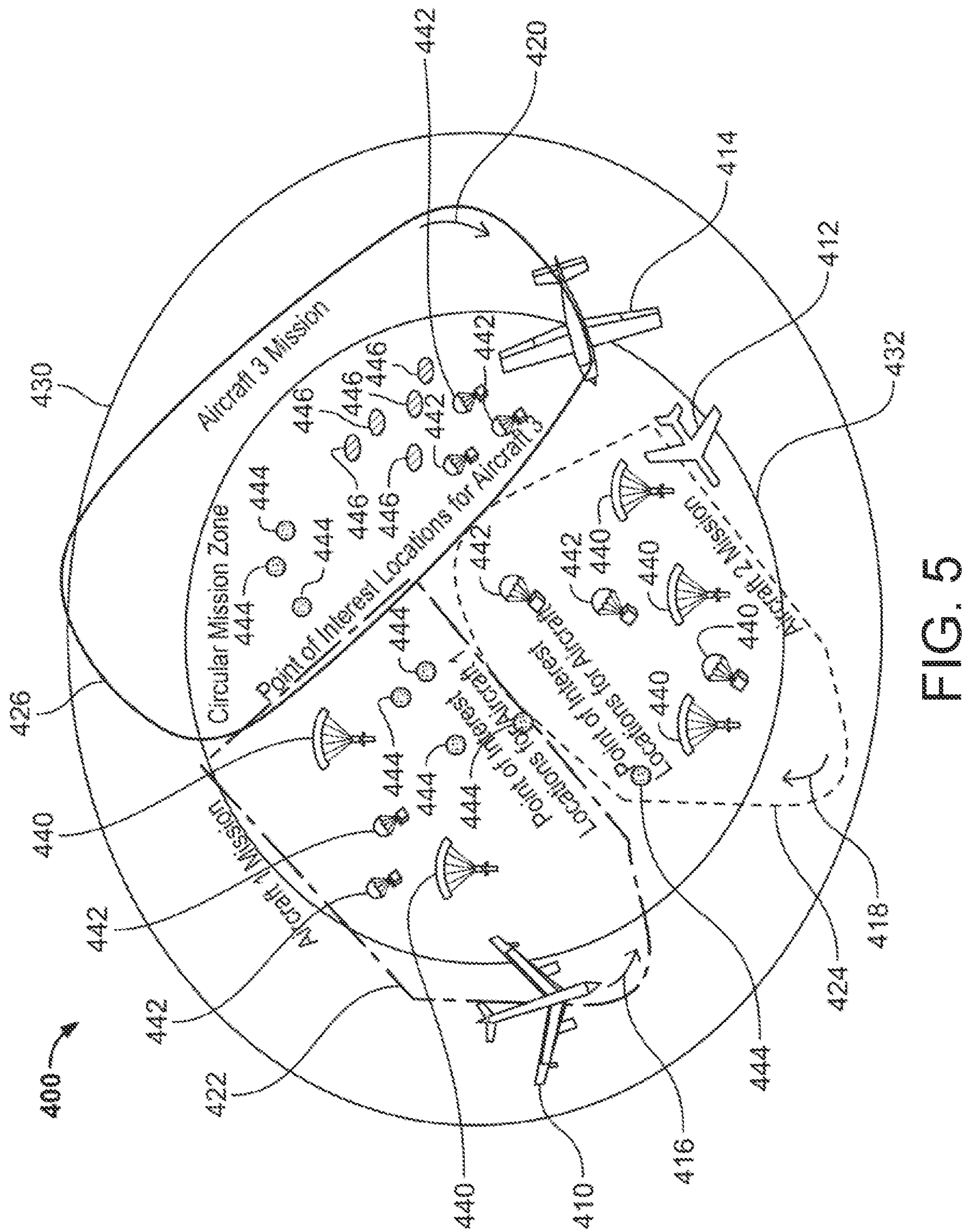
FIGS. 5-8 schematically represent exemplary common displays provided by the system of FIGS. 1 and 2 during a SAR operation in accordance with an embodiment.

Referring now to FIG. 5, an example of one of the common displays 400 is presented for a SAR operation. The depicted common display 400 includes an overall coverage area 430 and a mission coverage area 432. The overall coverage area 430 generally encircles a geographic area in which aircraft associated with the SAR operation are operating. The mission coverage area 432 generally encircles a geographic area in which the SAR operation is to be conducted. In this example, aircraft icons 410, 412 and 414 are presented that represent locations of aircraft 100 that are actively participating in the SAR operation. The aircraft icons 410, 412, and 414 differ in appearance and are each configured to indicate a type of the corresponding aircraft 100.

The headings and flight paths of the aircraft 100 are represented on the common display 400. Specifically, the aircraft 100 associated with the aircraft icon 410 is flying at a first heading (arrow icon 416) along a first flight path (continuous path 422), the aircraft 100 associated with the aircraft icon 412 is flying at a heading (arrow icon 418) along a flight path (continuous path 424), and the aircraft 100 associated with the aircraft icon 414 is flying at a heading (arrow icon 420) along a flight path (continuous path 426). The flight paths (i.e., paths 422, 424, and 426) are arranged to efficiently cover the mission coverage area 432 with little or no overlap. In various embodiments, the flight paths (i.e., paths 422, 424, and 426) may be designated by a user of the mission controller 11. The arrow icons 416, 418, and 420, and the continuous paths 422, 424, and 426 may be rendered in a visually distinguishing manner, such as different light weights, line types, and/or colors.

Various points-of-interest (POIs) and their locations are represented on the common display 400. For example, a first type of POI 440 represents individuals that have parachuted from the aircraft 100, a second type of POI 442 represents objects that have been deployed (via parachute) from the aircraft 100, a third type of POI 444 and a fourth type of POI 466 may represent located objects, individuals, or areas related to the a target of the SAR operation. The common display 400 may include more or fewer POIs and may include POIs of types other than those shown in FIG. 5. The POIs may be identified manually by crew of the aircraft 100, automatically by the system 10, or a combination of input by the crew of the aircraft and operations of the system 10. For example, a crew of one of the aircraft 100 may manually indicate that a POI is currently observed by a camera, and the system 10 may determine the location that the camera is observing and render a corresponding POI icon at the location.

Figures 6, 7, 8:
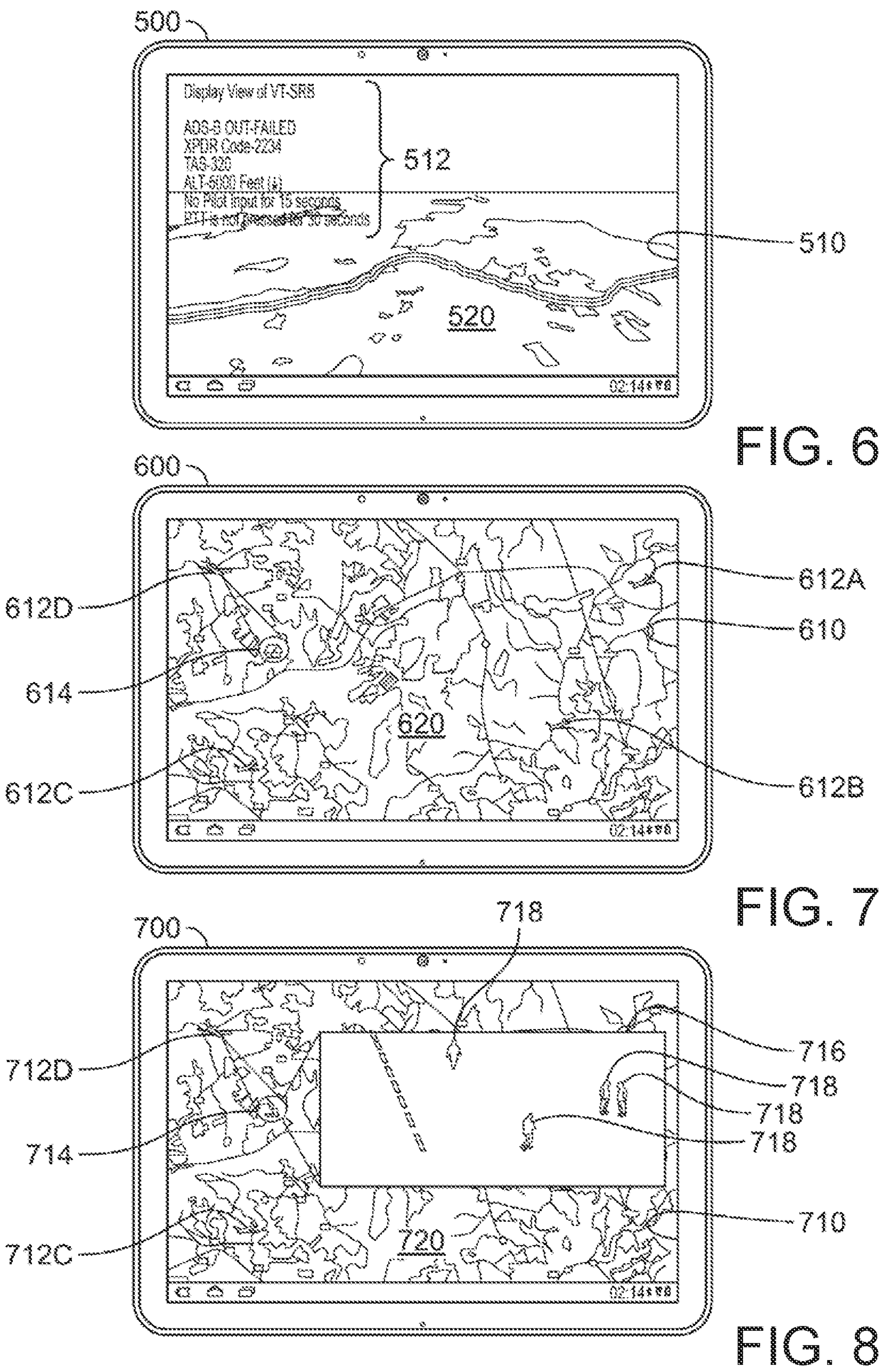

Referring now to FIGS. 6-8, nonlimiting examples are provided of display devices 500, 600, and 700 with displays 510, 610, and 710, respectively, generated thereon. The displays 510, 610, and 710 may be common displays simultaneously displayed on multiple display devices (e.g., the display devices 32 and 132).

Referring to FIG. 6, the display 510 includes a terrain environment 520, in this example a glass cockpit view of one of the aircraft 100 (VT-SRB). Emergency parameters 512 (i.e., safety critical data) are overlaid on the terrain environment 520 indicating a possible emergency situation with the aircraft 100 associated with one of the aircraft 100. The display 510 promotes awareness of the emergency situation in real-time amongst all of the crew of the aircraft 100 and the operator of the mission controller 11.

Referring now to FIG. 7, the display 610 includes a terrain environment 620, in this case a geographical map or view of the mission coverage area from above. Various icons are overlaid on the terrain environment 620 representing locations of objects relative to the depicted terrain. In this example, aircraft icons 612A, 612B, 612C, and 612D are rendered to indicate the locations and headings of corresponding aircraft 100. The aircraft icon 612D is distinguished from the other aircraft icons 612A, 612B, and 612C to indicate that the crew of the aircraft 100 associated with the aircraft icon 612D is currently speaking. A POI icon 614

(depicted as a tent) indicates the location of a POI (e.g., a target encampment) located by the aircraft 100 associated with the aircraft icon 612D. The display 600 promotes awareness of the speaking aircraft and the POI in real-time amongst all of the crew of the aircraft 100 and the operator of the mission controller 11.

Referring now to FIG. 8, the display 710 includes a terrain environment 720, in this case a geographical map or view of the mission coverage area from above. Various icons are overlaid on the terrain environment 720 representing locations of objects relative to the depicted terrain. In this example, aircraft icons 712A and 712B are rendered to indicate the locations and headings of corresponding aircraft 100. The aircraft icon 712B is distinguished from the other aircraft icon 712A to indicate that the crew of the aircraft 100 associated with the aircraft icon 712B is currently speaking. A POI icon 714 indicates the location of a POI (e.g., a group of people) located by the aircraft 100 associated with the aircraft icon 712B. A view of a thermal camera aboard the aircraft 100 associated with the aircraft icon 712B is shared as a popup window 715 which depicts various individuals 718 observed by the thermal camera. The display 700 promotes awareness of the speaking aircraft and the POI in real-time amongst all of the crew of the aircraft 100 and the operator of the mission controller 11.

The systems and methods disclosed herein provide various benefits over certain existing systems and methods. For example, communication between aircraft, especially communication via radio telephony, the difficulty for each operators to communicate may increase and the amount of information provided may be limited due to communication congestion. The systems and methods herein promote communication between aircraft by providing a common display on display devices in each of the aircraft that depict a terrain environment, aircraft icons for each of the aircraft indicating the locations thereof, and an indication of which, if any, of the aircraft are currently communicating based on an analysis of the communication. As such, the systems and method herein effectuate an improvement to aircraft communication systems and/or communication between aircraft.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for promoting communication between mobile platforms, the method comprising:

storing, in one or more databases, voice profile data including voice profiles associated with operators of each of the mobile platforms;

receiving audio data that include speech from the operators of the mobile platforms;

optionally, receiving transponder data indicating locations of each of the mobile platforms;

providing, by a processor, a common display on display devices in each of the mobile platforms, the common display including a terrain environment and mobile platform icons for each of the mobile platforms on the terrain environment indicating the locations of each of the mobile platforms;

analyzing, by the processor, the speech of the audio data to identify in real-time a first of the operators of the mobile platforms that is currently speaking by correlating the speech with one of the voice profiles of the voice profile data;

identifying, by the processor, a first of the mobile platforms associated with the first operator;

indicating, on the common display by the processor, in real-time that the audio data is associated with the first mobile platform;

associating all of the mobile platforms as members of a mission to be conducted in a geographic mission coverage area;

receiving mission input parameters of the mission in real-time from one or more sources including each of the mobile platforms;

determining, by the processor, mission output parameters of the mission based at least in part on the mission input parameters, capabilities of the mobile platforms, and safety criteria; and displaying, by the processor, the mission output parameters on the common display.

2. The method of claim 1, wherein the mission is a search and rescue (SAR) mission, the mission input parameters include a search area, and the mission output parameters include a search and rescue pattern for one or more of the mobile platforms.

3. The method of claim 1, further comprising:

producing the voice profiles for the operators of each of the mobile platforms;

training a speaker identification module to identify each of the operators using the voice profiles; and testing the speaker identification module to ensure that the speaker identification module is capable of identifying each of the operators in real-time by correlating speech of the operators with the voice profiles, wherein the step of processing the speech of the audio data to identify in real-time which of the operators of the mobile platforms are currently speaking is performed with the speaker identification module.

4. The method of claim 1, further comprising:

visually differentiating, on the common display by the processor, the mobile platform icons of each of the mobile platforms to indicate a capability and/or type of mobile platform associated therewith.

5. The method of claim 1, further comprising:

rendering, on the common display by the processor, visual representations of travel paths and/or travel patterns of each of the mobile platforms.

6. The method of claim 1, further comprising:

receiving, from one or the mobile platforms, safety critical data; and displaying, on the common display by the processor, the safety critical data.

7. The method of claim 1, further comprising:

identifying, by the processor, a point of interest in the speech of the audio data; and rendering, on the common display by the processor, a point of interest (POI) icon indicating a location of the point of interest based on an orientation of the first mobile platform and a flight path of the first mobile platform.

8. The method of claim 7, wherein the point of interest includes an individual or an object deployed from the first mobile platform.

9. The method of claim 7, further comprising, by the processor:

associating all of the mobile platforms as members of a mission to be conducted in a geographic mission coverage area, wherein the mission includes locating a target, wherein the point of interest includes an individual or an object identified in the mission input parameters as the target.

10. The method of claim 1, further comprising:

receiving visual data that includes one or more captured images, one or more captured videos, or a streaming video feed in real-time from the first mobile platform; and displaying, on the common display by the processor, in real-time the visual data.

11. A system for promoting communication between mobile platforms, the system comprising:

one or more databases storing voice profile data including voice profiles associated with operators of each of the mobile platforms;

a communication system configured to receive audio data from each of the mobile platforms that include speech from the operators of the mobile platforms, wherein the communication system is optionally configured to receive transponder data from each of the mobile platforms indicating locations of each of the mobile platforms;

a display system configured to provide a common display on display devices in each of the mobile platforms, the common display including a terrain environment and mobile platform icons for each of the mobile platforms on the terrain environment indicating the locations of each of the mobile platforms;

a controller in operable communication with the one or more databases, the communication system, and the display system, the controller configured to, by a processor:

analyze the speech of the audio data to identify in real-time a first of the operators of the mobile platforms that is currently speaking by correlating the speech with one of the voice profiles of the voice profile data;

identify a first of the mobile platforms associated with the first operator;

indicate, on the common display, in real-time that the audio data is associated with the first mobile platform;

associate all of the mobile platforms as members of a mission to be conducted in a geographic mission coverage area;

receive mission input parameters of the mission in real-time from one or more sources including each of the mobile platforms;

determine mission output parameters of the mission based at least in part on the mission input parameters, capabilities of the mobile platforms, and safety criteria; and display the mission output parameters on the common display.

12. The system of claim 11, wherein the mission is a search and rescue (SAR) mission, the mission input parameters include a search area, and the mission output parameters include a search and rescue pattern for one or more of the mobile platforms.

13. The system of claim 11, wherein the controller is configured to, by the processor:

visually differentiate, on the common display, the mobile platform icons of each of the mobile platforms to indicate a capability and/or type of mobile platform associated therewith.

14. The system of claim 11, wherein the controller is configured to, by the processor:

render, on the common display, visual representations of travel paths and/or travel patterns of each of the mobile platforms.

15. The system of claim 11, wherein the controller is configured to, by the processor:

receive, from one or the mobile platforms, safety critical data; and display, on the common display, the safety critical data.

16. The system of claim 11, wherein the controller is configured to, by the processor:

identify a point of interest in the speech of the audio data; and render, on the common display, a point of interest (POI) icon indicating a location of the point of interest based on an orientation of the first mobile platform and a flight path of the first mobile platform.

17. The system of claim 16, wherein the controller is configured to, by the processor:

associate all of the mobile platforms as members of a mission to be conducted in a geographic mission coverage area, wherein the mission includes locating a target, wherein the point of interest includes an individual or an object identified in the mission input parameters as the target.

18. The system of claim 11, wherein the controller is configured to, by the processor:

receive visual data that includes one or more captured images, one or more captured videos, or a streaming video feed in real-time from the first mobile platform; and display, on the common display, in real-time the visual data.

19. A system for promoting communication between mobile platforms, the system comprising:

one or more databases storing voice profile data including voice profiles associated with operators of each of the mobile platforms;

a communication system configured to receive audio data from each of the mobile platforms that include speech from the operators of the mobile platforms, wherein the communication system is optionally configured to receive transponder data from each of the mobile platforms indicating locations of each of the mobile platforms;

a display system configured to provide a common display on display devices in each of the mobile platforms, the common display including a terrain environment and mobile platform icons for each of the mobile platforms on the terrain environment indicating the locations of each of the mobile platforms;

a controller in operable communication with the one or more databases, the communication system, and the display system, the controller configured to, by a processor:

analyze the speech of the audio data to identify in real-time a first of the operators of the mobile platforms that is currently speaking by correlating the speech with one of the voice profiles of the voice profile data;

identify a first of the mobile platforms associated with the first operator;

indicate, on the common display, in real-time that the audio data is associated with the first mobile platform;

identify a point of interest in the speech of the audio data; and render, on the common display, a point of interest (POI) icon indicating a location of the point of interest based on an orientation of the first mobile platform and a flight path of the first mobile platform.

20. The system of claim 19, wherein the controller is configured to, by the processor:

associate all of the mobile platforms as members of a mission to be conducted in a geographic mission coverage area, wherein the mission includes locating a target, wherein the point of interest includes an individual or an object identified in the mission input parameters as the target.

* * * * *